P. W. SWEENEY & O. J. KENNEDY.
IRRIGATION SYSTEM.
APPLICATION FILED AUG. 25, 1909.
954,059.
Patented Apr. 5, 1910.
2 SHEETS—SHEET 2.
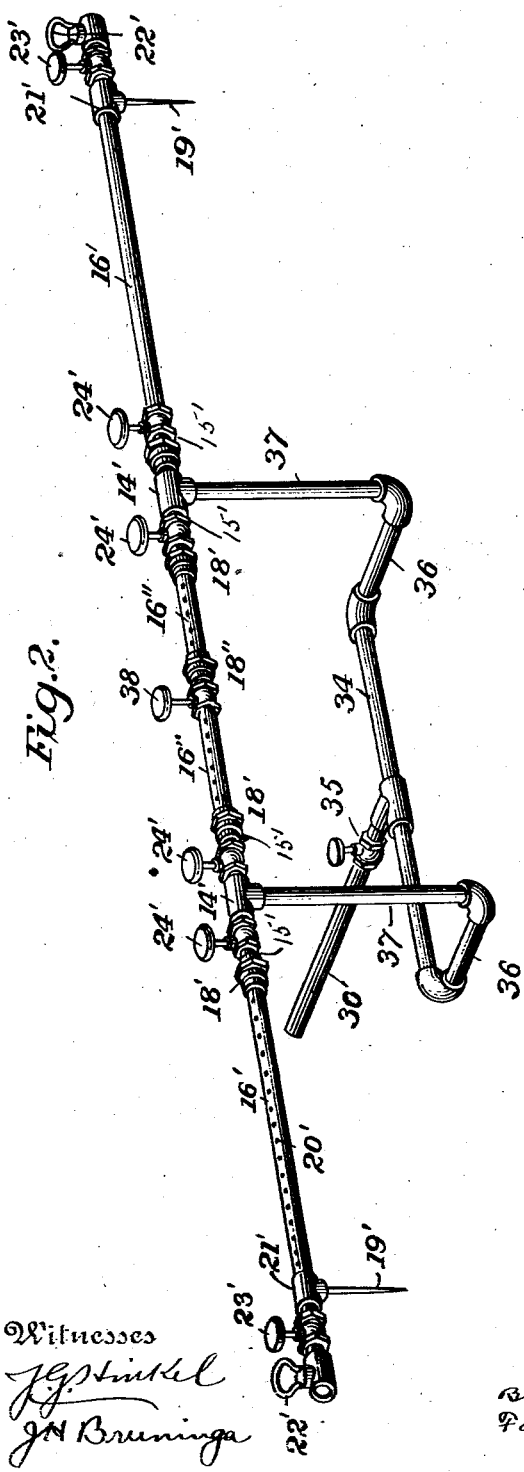
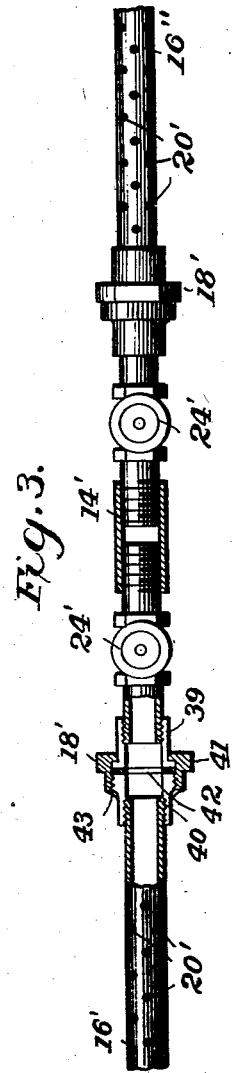

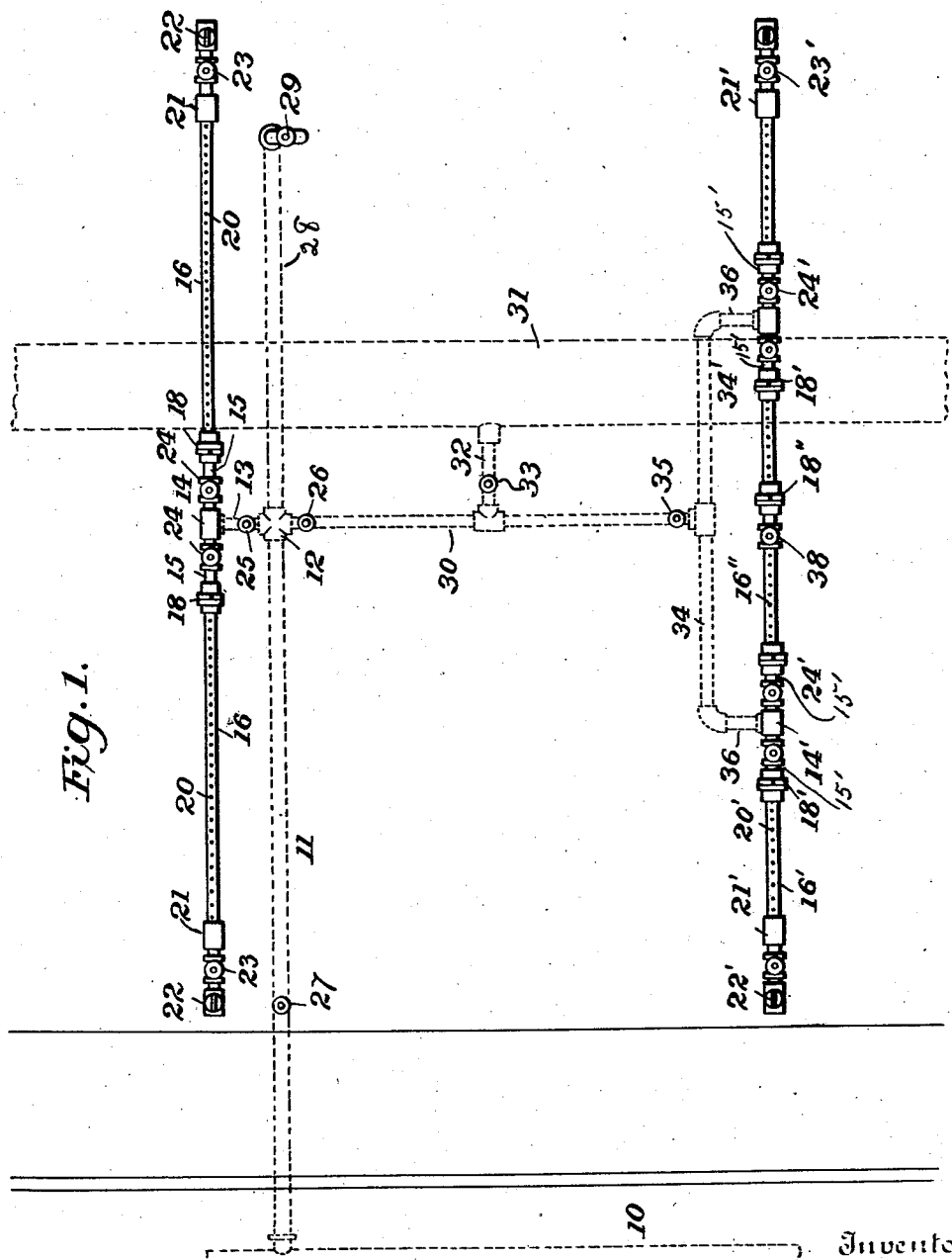

UNITED STATES PATENT OFFICE.

PATRICK WEBSTER SWEENEY AND OLIVER JEFFERSON KENNEDY, OF SAN DIEGO, CALIFORNIA.

IRRIGATION SYSTEM.

954,059.   Specification of Letters Patent.   Patented Apr. 5, 1910.

Application filed August 25, 1909. Serial No. 514,615.

*To all whom it may concern:*

Be it known that we, PATRICK W. SWEENEY and OLIVER J. KENNEDY, citizens of the United States, and residents of San Diego, San Diego county, California, have invented certain new and useful Improvements in Irrigation Systems, of which the following is a specification.

This invention relates to a system of irrigation.

The objects of the invention are to provide a system of irrigation in which it is insured that the soil will be uniformly irrigated and to simplify and improve the construction of the piping in general.

In the drawings,—Figure 1 is a plan view of this invention; Fig. 2 is a detail perspective view; and Fig. 3 is a detail view partly in section.

Referring to the drawings, 10 designates a water main which has connected to it a branch pipe 11 provided with a cross 12. A supply pipe 13 is connected to this cross and is provided with a riser. A central section comprising a T, 14 and sections 15, 15 is connected to the riser. A pair of irrigation pipes 16, 16 are connected to the sections 15, 15 by means of unions 18, 18. The irrigation pipes 16, 16 are provided with perforations 20, extending lengthwise thereof and are supported by means of supports 21, 21, which are in the form of T's of larger diameter than the pipe so that they support the pipe loosely, sharp stakes being screwed into the T's and driven into the ground as shown more clearly in Fig. 2. The ends of the irrigation sections 16, 16 are provided with handles 22, 22 and with flushing valves 23, 23. The central section is provided with valves 24, 24 situated on opposite sides of the T, 14. A valve 25 is located in the supply pipe 13 to control the supply to the central section and the radiating irrigation pipes. By means of the above construction the irrigation sections 16, 16 may be rotated by means of the handles 22, 22, or the valves 23, 23, the provision of the unions 18, 18 permitting such rotation.

As shown in Fig. 1, the sections 16, 16 are provided with only one row of perforations. In practice, however, the pipes are provided with three or more rows of perforations which are staggered. The soil upon each side of the pipes may be uniformly irrigated by rotating the pipes 20, and by providing a number of rows of perforations it is only necessary to locate the pipe in two positions in order to thoroughly irrigate the soil on each side of the pipe. By the provision of the independent valves 24, 24 located in the radiating sections 15, 15, it is possible to control independently the supply to the irrigation sections 16, 16 and thereby control the distance that the jets of water are thrown. The flushing valves 23, 23, permit the irrigation pipes as well as the radiating sections to be thoroughly flushed and cleaned. After the valves 24, 24' are properly adjusted the supply to the two sections may be adjusted simultaneously by means of the single valve 25.

A branch pipe 28 may be connected to the cross 12 and provided with the usual hydrant 29, and branch pipe 11 may be provided with a valve 27. A second supply pipe 30 is connected to the cross 12 and controlled by a valve 26. This supply pipe 30 is connected to the drain or sewer pipe 31 by means of a branch pipe 32 controlled by a valve 33. The supply pipe 30 is connected to branch supply pipes 34, 34, the supply thereto being controlled by a valve 35. These branch supply pipes connect by suitable L's with pipes 36, 36 connected to risers 37, 37. These risers are connected to T's 14', 14' which connect with the intermediate sections 15', 15'. These intermediate sections have connected thereto outside radiating sections 16', 16' and inside radiating sections 16'', 16'' connected to the intermediate sections by means of unions 18', 18', 18', 18', the inside radiating sections being connected by means of a union 18''. The radiating sections 16', 16' and 16'', 16'' are provided with three rows of holes 20' and form the irrigation pipe. Suitable controlling valves 24' are located upon each side of the T's 14', 14' and a single controlling valve 38 is located between the inside radiating sections 16''. The irrigation pipe is supported at the ends by means of supports 21' provided with sharp stakes 19' which may be driven into the ground. Handles 22' are provided for rotating the pipe and flushing valves 23' are located in the outside radiating sections for the purpose of allowing the irrigation pipe to be flushed.

Referring to Fig. 3, the union comprises sections 39, 40 and 41, the usual washer 42 being provided. This washer, however, is in this instance formed of leather with copper faces. By means of this construction wear is prevented. After the union is in place the sections 40, 41 are permanently secured together by means of solder, as shown at 43. In this way all leakage is prevented.

The outside sections 16' may be rotated by means of handles 22' so as to uniformly irrigate the soil upon each side of the pipe. The inside sections 16'' may be rotated in any suitable manner. As shown, one of the sections may be rotated by means of the valve stem 38, while the other section may also be provided with any suitable handle. The provision of separate sections of pipe allows of easy adjustment since the attendant may rotate one section so as to throw the water on one side of the pipe and then he may move over on the other side of the pipe and rotate the other section without danger of having water thrown on him. By means of the valves 24' and 38 the supply of water to the separate sections may be independently controlled and the single valve 35 controls the supply of water to all of the sections. By means of the flushing valves 23' the irrigation pipe may be thoroughly flushed and cleaned.

It will be noted that the pipes 34, 34, 36, 36, 37, 37, T's 14' 14', sections 15' 15', and the inside radiating sections 16'' 16'', form collectively what may be termed a central section with the outside sections 16' 16' radiating from it.

It is obvious that various changes may be made without departing from the spirit of this invention and it is therefore to be understood that this invention is not to be limited to the specific construction shown and described.

Having thus described the invention, what is claimed as new is:

1. In a system of irrigation, the combination with a supply pipe, of an irrigation pipe comprising a central section connected to the supply pipe, radiating sections connected to the central section by rotatable union joints and provided with a plurality of rows of perforations located along the pipe, whereby said sections may be rotated to cause the water to be thrown on either side of the irrigation pipe, valves in said central section to independently control the supply to the radiating sections, said radiating sections being open at their ends, and flushing valves located at the ends of the radiating sections and forming handles whereby said sections may be rotated.

2. In a system of irrigation, the combination with a main supply pipe, of branch supply pipes connected thereto, an irrigation pipe line connected to said branch pipes, said irrigation pipe line comprising intermediate sections connected respectively to the branch pipes, outside radiating sections connected to the intermediate sections by rotatable union joints, and inside radiating sections connected to the intermediate sections and to each other by rotatable union joints, said radiating sections being provided with perforations, whereby said sections may be independently rotated to cause the water to be thrown on either side of the irrigation pipe line, and valves in said intermediate sections to independently control the supply to the respective radiating sections.

3. In a system of irrigation, the combination with a main supply pipe, of branch supply pipes connected thereto, an irrigation pipe line connected to said branch pipes, said irrigation pipe line comprising intermediate sections connected respectively to the branch pipes, outside radiating sections connected to the intermediate sections by rotatable union joints, inside radiating sections connected to the intermediate sections and to each other by rotatable union joints, said radiating sections being provided with perforations, whereby said sections may be independently rotated to cause the water to be thrown on either side of the irrigation pipe line, valves in said intermediate sections, and a valve between the inside radiating sections to independently control the supply to the radiating sections, and flushing valves in the ends of the outside radiating sections.

In testimony whereof we affix our signatures in presence of two witnesses.

PATRICK WEBSTER SWEENEY.
OLIVER JEFFERSON KENNEDY.

Witnesses for Patrick W. Sweeney:
  ISAAC BROWN,
  JOHN W. COWLES.
Witnesses for Oliver J. Kennedy:
  HOYT HALL,
  PAULINE HALL.